United States Patent [19]
Deng

[11] Patent Number: 5,893,147
[45] Date of Patent: Apr. 6, 1999

[54] METHOD AND APPARATUS FOR DISTINGUISHING SYSTEM MEMORY DATA FROM ALTERNATIVE MEMORY DATA IN A SHARED CACHE MEMORY

[75] Inventor: Feng Deng, San Jose, Calif.

[73] Assignee: Intel Corporation, Santa Clara, Calif.

[21] Appl. No.: 938,407

[22] Filed: Sep. 26, 1997

Related U.S. Application Data

[63] Continuation of Ser. No. 683,919, Jul. 19, 1996, abandoned, which is a continuation of Ser. No. 361,943, Dec. 22, 1994, abandoned.

[51] Int. Cl.$^6$ .............................. G06F 12/00; G06F 13/00
[52] U.S. Cl. .............................. 711/130; 711/3; 711/118; 711/141; 711/148
[58] Field of Search .................... 364/DIG. 1, DIG. 2; 711/118, 129, 130, 131, 147, 148, 149, 3, 141

[56] References Cited

U.S. PATENT DOCUMENTS

| | | | |
|---|---|---|---|
| 4,394,731 | 7/1983 | Flusche et al. | 395/445 |
| 4,794,521 | 12/1988 | Ziegler et al. | 395/445 |
| 4,825,357 | 4/1989 | Ovies et al. | 711/129 |
| 4,959,777 | 9/1990 | Holman, Jr. | 395/445 |
| 5,226,147 | 7/1993 | Fujishima | 395/445 |
| 5,276,835 | 1/1994 | Mohan et al. | 395/440 |
| 5,287,473 | 2/1994 | Mohan et al. | 395/440 |
| 5,287,480 | 2/1994 | Wahr | 395/458 |
| 5,367,660 | 11/1994 | Gat et al. | 711/171 |
| 5,371,855 | 12/1994 | Idleman et al. | 395/457 |
| 5,394,555 | 2/1995 | Hunter et al. | 395/800 |
| 5,398,325 | 3/1995 | Chang et al. | 395/403 |
| 5,418,927 | 5/1995 | Chang et al. | 395/457 |
| 5,428,761 | 6/1995 | Herlihy et al. | 395/457 |
| 5,434,992 | 7/1995 | Mattson | 395/457 |
| 5,442,747 | 8/1995 | Chan et al. | 395/164 |

OTHER PUBLICATIONS

David A. Patterson and John L. Hennessy, *Computer Architecture A Quantitive Approach*, 8.3 Caches, 1990, pp. 408 and 410, Morgan Kaufmann Publishers, Inc., San Mateo, California.

*Cache Tutorial*, Intel Corporation Manual, 1991.

*Primary Examiner*—Tod R. Swann
*Assistant Examiner*—Tuan V. Thai
*Attorney, Agent, or Firm*—Blakely, Sokoloff, Taylor & Zafman LLP

[57] ABSTRACT

A shared cache in a computer system for caching both system memory information and alternative memory information. The present invention includes cache management logic, a cache memory with a plurality of cache lines and a and a cache tag memory. The cache tag memory comprises an address field and status bits for indicating a status of corresponding information in cache memory. The status bits, when interpreted as a group, indicate the status of the corresponding information in cache memory as well as whether the information in the corresponding cache line is related to the alternative memory or the system memory.

6 Claims, 6 Drawing Sheets

| V0 | M0 | V1 | M1 | MEMORY | SECTOR 0 | SECTOR 1 |
|---|---|---|---|---|---|---|
| 0 | 0 | 0 | 0 | NONE/EITHER | I | I |
| 1 | 0 | 0 | 0 | SYSTEM | E | I |
| 1 | 1 | 0 | 0 | | M | I |
| 0 | 0 | 1 | 0 | | I | E |
| 1 | 0 | 1 | 0 | | E | E |
| 1 | 1 | 1 | 0 | | M | E |
| 0 | 0 | 1 | 1 | | I | M |
| 1 | 0 | 1 | 1 | | E | M |
| 1 | 1 | 1 | 1 | | M | M |
| 0 | 1 | 0 | 0 | SMRAM (Alternative Mem.) | E | I |
| 0 | 1 | 1 | 0 | | I | M |
| 0 | 0 | 0 | 1 | | I | E |
| 1 | 0 | 0 | 1 | | M | I |
| 0 | 1 | 0 | 1 | | E | E |
| 0 | 1 | 1 | 1 | | M | M |
| 1 | 1 | 0 | 1 | UNDEFINED | | |

FIGURE 6

METHOD AND APPARATUS FOR DISTINGUISHING SYSTEM MEMORY DATA FROM ALTERNATIVE MEMORY DATA IN A SHARED CACHE MEMORY

This is a continuation of application Ser. No. 08/683,919, filed Jul. 19, 1996, now abandoned, which is a continuation of application Ser. No. 08/361,943, filed Dec. 22, 1994, now abandoned.

FIELD OF THE INVENTION

The present invention relates to the field of computer systems. Specifically, the present invention relates to the caching of system memory information and alternative memory information in a shared cache memory.

BACKGROUND OF THE INVENTION

Today's integrated circuit and computer system designers must carefully weigh tradeoffs between functionality, space and performance in their designs. For example, computer memory subsystem designers have many variables to consider when designing the cache memory architecture of the memory subsystem. Each decision regarding the cache memory architecture will have an impact on overall memory subsystem performance. Generally, the designer's goal is to design a high performance memory subsystem using as little space (e.g. silicon) as possible.

Cache memories are very fast local storage memory arrays used by the central processing unit (CPU). Cache memories are usually significantly faster than main system memory based on their access time and close proximity to the CPU and are, therefore, useful in increasing overall system performance. Recently and/or frequently accessed instructions or data are stored in cache memory on the assumption that they will be used soon. By storing this information in a cache memory, it can be accessed more quickly than going to slower system memory or disk.

Cache memories generally comprise data cache memory, tag memory and cache management logic. Data cache memory is a block of fast memory (usually static random access memory or SRAM) for storage of data and/or instructions and is usually referred to as the "data cache RAM". It should be noted that the word "information" in reference to the contents of a cache memory is used herein to indicate either data or instructions stored in the cache memory. Also, the word "shared" in reference to a cache memory is used herein to indicate that information from two memories, a RAM and an alternative memory in one embodiment, is stored in the same cache memory.

Tag memory comprises a cache tag for each line of cache memory. Tag memory usually comprises a block of SRAM for storing the original logical address of the information stored in the corresponding area of the data cache RAM. In other words, the address stored in the tag memory indicates where the corresponding information in the cache memory originated from in the case of information written to the cache memory from another memory. When the information is written to the cache memory from the CPU, the tag indicates the address in memory that the information is destined for. In many cases, tag memory stores only part of the address. The remainder of the address is indicated by the location in cache memory where the information is stored. For example, a cache memory with cache lines 0–FF may be used to store information from logical address FFFF in main system memory in cache line FF. The cache tag corresponding to that particular location in cache memory would contain the address FF. Thus, the original logical address of information stored in a cache memory can be determined from the cache tag and the location of the information in cache memory in many cache configurations.

Tag memory may also include additional status bits for use by the cache management logic. Examples of status bits used may include a "least recently used" or "LRU" bit to indicate the information that was accessed last in the case of a set associative cache memory. A "valid" bit may be used to indicate whether the corresponding information is valid or a "modify" bit may be used to indicate whether the corresponding information in cache memory has been modified so that it is no longer consistent with the information in system memory or an alternative memory.

Tag memory is often referred to as "tag RAM" or simply the "cache tag". The address portion of the tag RAM is frequently 14 or more bits wide and may include one or more status bits. Generally, there is a cache tag for each line in the corresponding cache memory. Today's cache memories frequently comprise 4000 or more lines. Thus, the tag RAM can be a very sizable portion of the overall cache memory.

Cache management logic performs many functions related to the reading and writing of cache memory. For example, the cache management logic reads the cache tag including both the address and the status bits to determine whether an item in memory requested by the CPU is present in the cache memory. The general architecture and operation of data cache RAM, tag RAM, and cache management logic are well known to those of ordinary skill in the art.

Cache memory is used to store frequently used data and/or instructions for the computer system processor. The information in cache memory is associated with (either is stored from or will be written to) an external memory in the computer system often referred to as main or system memory. Some computer systems, however, are designed with both system memory (usually dynamic random access memory or DRAM) and an alternative memory (usually also DRAM). This alternative memory may be accessible only in a particular mode of the computer system during operation. It is desirable to have a cache memory available to cache both system memory information and alternative memory information to improve system performance.

Prior art systems have approached this design issue in various ways. One method is to use two separate cache memories: one for the system memory and one for the alternative memory. This design is costly in terms of efficiency, space and memory as it requires not only two data cache RAMs, but also two cache tag RAMs and potentially, separate cache control logic.

Another approach shares one cache memory between two memories with non-overlapping logical addresses. In other words, all logical addresses of one memory are different from all logical addresses of the second memory. The cache control logic is able to distinguish between information related to the system memory and information related to the alternative memory based on the address of the information alone. This approach does not work, however, where the logical addresses of the two memories are the same or overlap. General cache control logic only provides for interpretation of address and status fields in the cache tag to manage information reads and writes. Where the logical addresses of two separate memories are the same and they share one cache memory, another method must be used to distinguish between information related to the system memory and information related to the alternative memory.

Where the logical addresses of the system memory and an alternative memory are the same, some prior art designs have added an extra bit to the cache tag to indicate whether the cache information associated with that specific tag corresponds to system memory or to the alternative memory. This method requires an increase in the size of the tag RAM by at least one bit per cache memory line. Cache memories are frequently 256 Kbytes, 512 Kbytes or larger and can contain 4096 or more cache memory lines. Even with an increase of only one bit per cache tag per line, this method can be costly in terms of silicon space.

Another prior art approach uses one of the existing address bits in the cache tag to indicate whether the corresponding cache information is associated with the system memory or the alternative memory. This method is similar in operation to the method described above, but instead of adding an extra bit, this method effectively reduces the cacheable memory. For example, a cache memory with a cache tag providing for 32 bit addresses is capable of addressing 4 gigabytes of memory. When one of the cache tag bits is used to indicate the memory with which the information is associated, the cache memory and the information in the cache tag are only able to indicate 31 bits of address information. 31 bits of address information is capable of addressing only 2 gigabytes of memory thereby effectively cutting the memory addressability of the cache memory in half.

Still another approach is to use one cache memory to cache both memories in a mutually exclusive manner. In other words, the cache memory is used only for system memory when the computer system is in one mode and only for alternative memory when the computer system is in another mode. Using this method, there is no concern for overlapping information that has the same logical address, but there is still a penalty. This method requires that the cache memory is flushed and any inconsistent information is written to the appropriate memory each time the system changes modes. Flushing the cache memory and writing any changed information to memory may require many computer execution cycles and have a measurable impact on overall system performance. This is especially true if the computer system switches between modes frequently.

As will be shown, the present invention provides a method and apparatus for caching two memories that may have the same or overlapping logical addresses in the same cache memory. The present invention provides the advantage of maintaining the size of the address portion of the cache tag, and thus, the amount of cacheable memory, without increasing the overall cache memory size. Additionally, the present invention does not require flushing of the cache memory when switching between modes that utilize the two memories.

SUMMARY OF THE INVENTION

A method and apparatus for caching system memory information and alternative memory information in a shared cache memory in a computer system is described. The present invention includes cache management logic, a cache memory with a plurality of cache memory lines and a cache tag memory. The cache tag memory comprises an address field and status bits for indicating a status of the corresponding information in cache memory. The status bits interpreted together as a whole, indicate the status of the corresponding information in cache memory as well as whether the information in the corresponding cache memory line is related to the alternative memory or the system memory.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 6 is a state table for one embodiment of the present invention.

DETAILED DESCRIPTION OF THE PRESENT INVENTION

A method and apparatus for caching system memory information and alternative memory information in a shared cache memory in a computer system is disclosed. In the following description, numerous specific details are set forth, such as particular cache memory configurations, specific numbers of bits or bytes in a particular field, status codes, etc., in order to provide a thorough understanding of the present invention. However, it will be apparent to one skilled in the art that the present invention may be practiced without these specific details. In other instances, well known structures, circuit blocks, interfaces, and architectural functions have not been described in detail in order to avoid obscuring the present invention.

Figure 1:
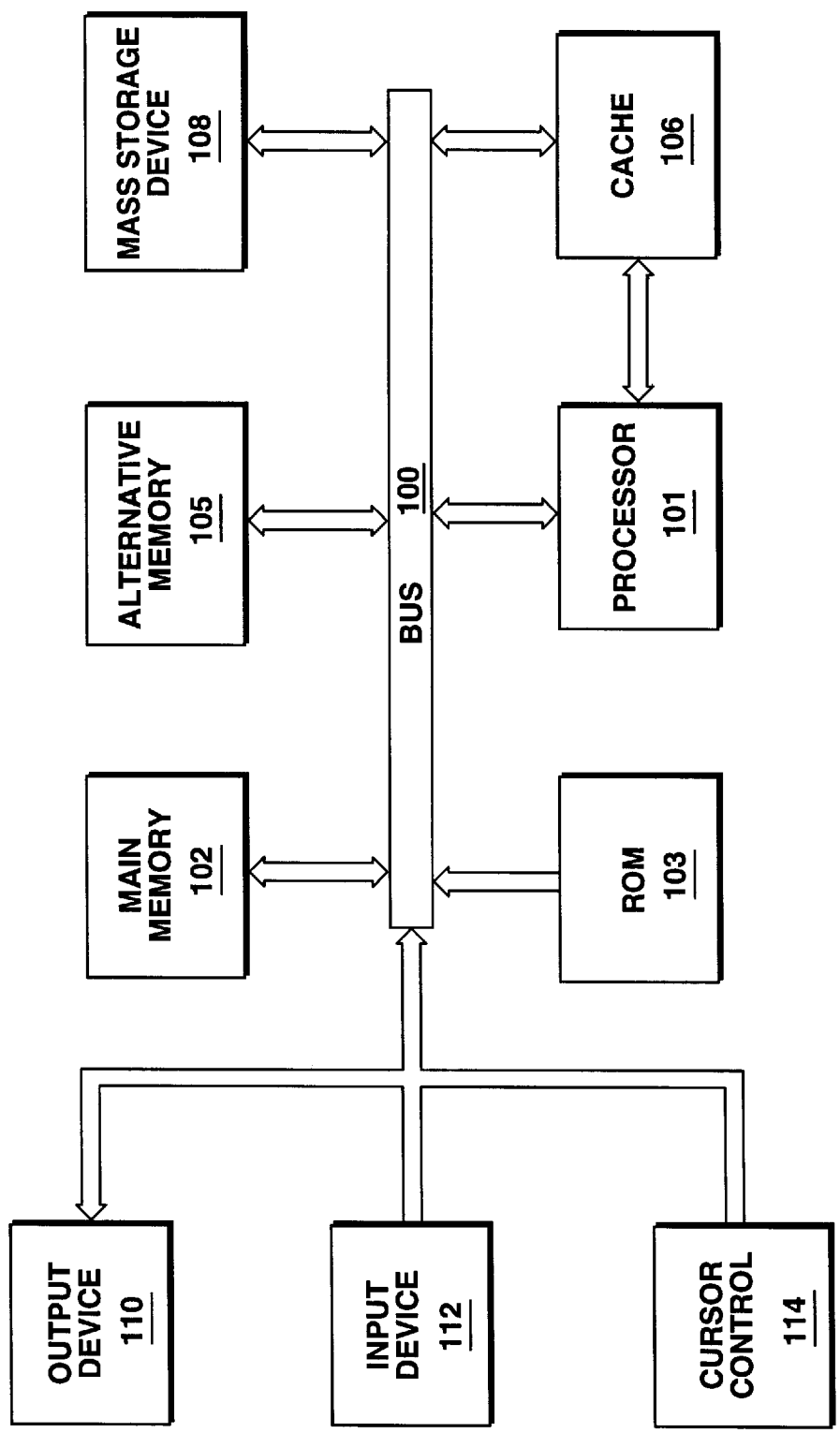
FIG. 1 is a high-level block diagram of one embodiment of the computer system of the present invention.

Referring to FIG. 1, a typical computer system in which the present invention operates is illustrated. The computer system of the present invention comprises a bus 100 for communicating information, a processor 101 coupled with the bus for processing information, a random access memory (RAM) 102, also referred to as system memory or main memory, coupled with the bus 100 for storing information and instructions for the processor 101, and a read only memory (ROM) 103 or other static storage device coupled with the bus 100 for storing static information and instructions for processor 101. The computer system of the present invention also includes alternative memory 105 for storing information and instructions for the processor 101 when the computer system of the present invention is operating in an alternative mode, and an external cache memory 106 for storing frequently and recently used information for processor 101. In one embodiment, alternative memory 105 and RAM 102 are separate integrated circuit devices; however, they may both be contained on the same device. Additional devices such as mass storage device 108, output device 110 such as a printer or monitor, input device 112 and cursor control 114 may also be included in the computer system of the present invention.

In one embodiment of the present invention, processor 101 is an Intel® Architecture Microprocessor such as manufactured by Intel Corporation of Santa Clara, Calif., the corporate assignee of the present invention. Other processors such as PowerPC™, Alpha™, etc. processors may also be used.

It will be apparent to those skilled in the art that other computer systems may be used with the present invention.

Similarly, it will be apparent to those skilled in the art that the computer system illustrated in FIG. 1 may include additional components not illustrated in FIG. 1 or may be configured without components that are illustrated in FIG. 1.

Overview of the Memory Subsystem

Figure 2:
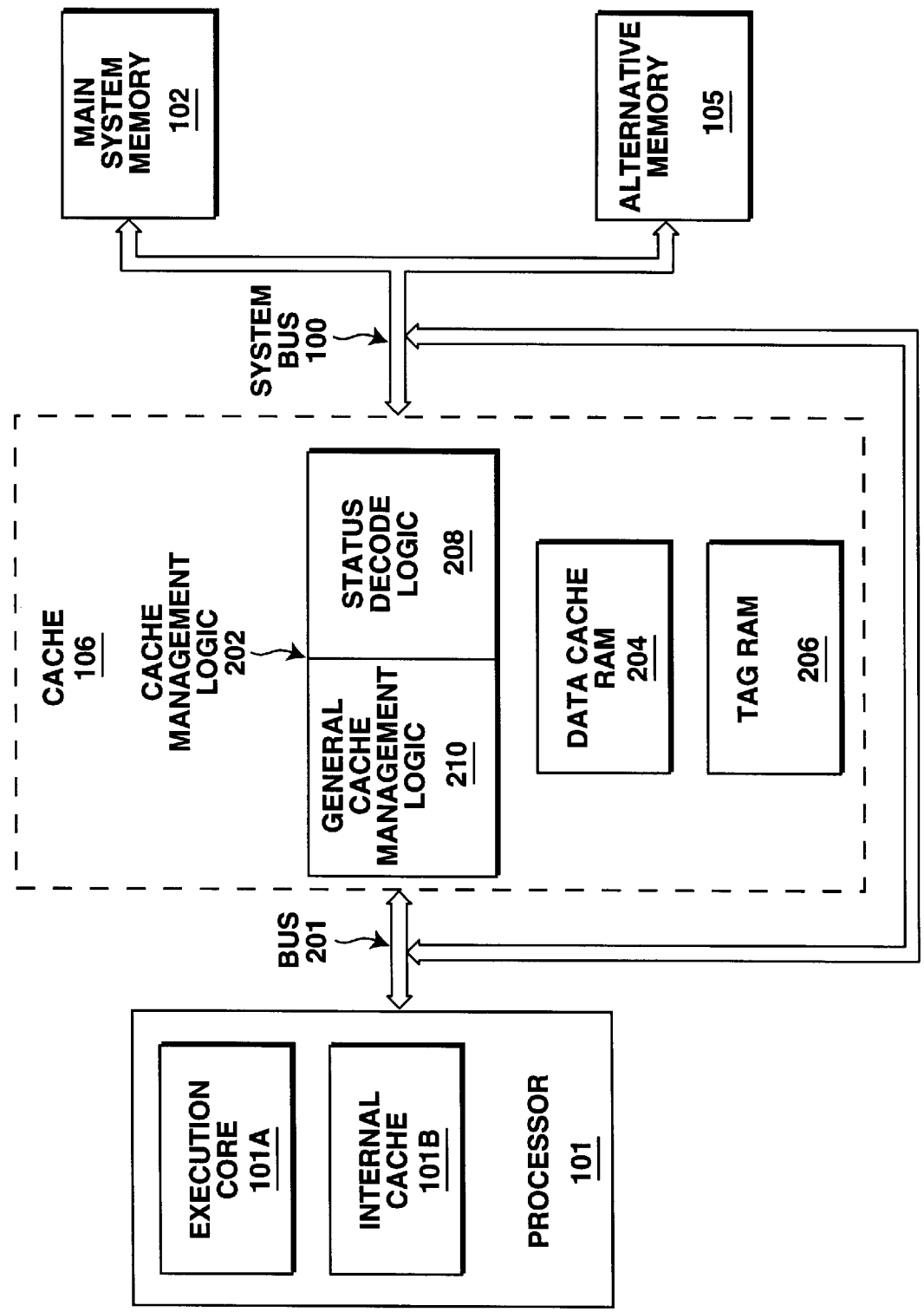
FIG. 2 is a block diagram of one embodiment of the memory subsystem of the present invention.

FIG. 2 illustrates one embodiment of the processor and external cache memory arrangement of the present invention. Referring to FIG. 2, processor 101 is coupled to external cache memory 106 by bus 201. Processor 101 is also coupled to the system bus 100. In one embodiment, processor 101 and external cache memory 106 are separate integrated circuit devices; however, they may both be contained in a dual cavity integrated circuit package.

Processor 101 of the present invention includes an execution core 101A for executing instructions using data from memory. In one embodiment of the present invention, processor 101 also includes an integrated cache memory such as cache memory 101B. Integrated cache memory 101B is referred to as a "level one" or "L1" cache memory in this case and external cache memory 106 is considered a level two (L2) cache memory. In another embodiment, processor 101 does not have an integrated cache memory and external cache memory 106 functions as the L1 cache memory. Execution core 101A is coupled to transmit information to and receive information from L1 cache memory 101B (if present) and external cache memory 106.

Cache memories generally comprise data cache memory 204, tag memory 206 and cache management logic 202. Data cache memory 204 is for storage of data and/or instructions and is usually referred to as the "data cache RAM". In one embodiment of the present invention, L1 cache memory 101B, L2 data cache RAM 204 and cache tag RAM 206 comprise static random access memory (SRAM). Data cache RAM 204 and cache tag RAM 206 are on the same integrated circuit die in one embodiment. In another embodiment, data cache RAM 204 and cache tag RAM 206 are on separate integrated circuit devices.

Cache tag RAM or "tag memory" 206 is for storage of the original main memory address of the information stored in the corresponding area of the data cache RAM 204. The word "information" in reference to the contents of a cache memory is used herein to indicate either data or instructions stored in the cache memory. Tag memory 206 may also include status information for use by the cache management logic. Tag memory 206 is usually referred to as "tag RAM" or simply the "cache tag". Tag memory 206 will be described in more detail below with reference to FIG. 4.

Cache management logic 202 includes, logic to perform tag matching, a replacement algorithm and information routing to satisfy memory requests from processor 101. General cache management functions are performed by general cache management logic 210. The use and operation of data cache RAM, tag RAM, and cache management logic are well-known to those of ordinary skill in the art. Cache management logic 202 also includes status bit decoding logic 208 for decoding the status bits of the cache tag RAM 206. The specific operation of status bit decoding logic according to the present invention is described in more detail below.

System memory 102 and alternative memory 105 are coupled to cache memory 106 via bus 100. In one embodiment of the present invention, system memory 102 and alternative memory 105 comprise dynamic random access memory (DRAM). Also, in one embodiment, alternative memory 105 is used primarily in System Management Mode (SMM) of the computer system and is referred to as System Management Random Access Memory or SMRAM. SMM is a low power mode often used in notebook and laptop computers and is well known to those of ordinary skill in the art. SMM is described in detail in the book by Desmond Yuen, *Intel's SL Architecture: designing portable applications*, published by McGraw Hill, Inc. in 1993. SMRAM 105 is RAM that is accessible to the processor when the computer system is in SMM. System memory 102 is also accessible in this mode, but more complex instructions are required to access system memory when the computer is in SMM. Similarly, SMRAM 105 is more difficult to access when the computer system is in a mode(s) which primarily makes use of system memory 102.

SMM is one example of an alternative computer system mode that makes use of an alternative memory. Other computer system modes which may use an alternative memory are considered to be within the scope of the present invention.

Cache Memory Architecture Overview

Figure 3:
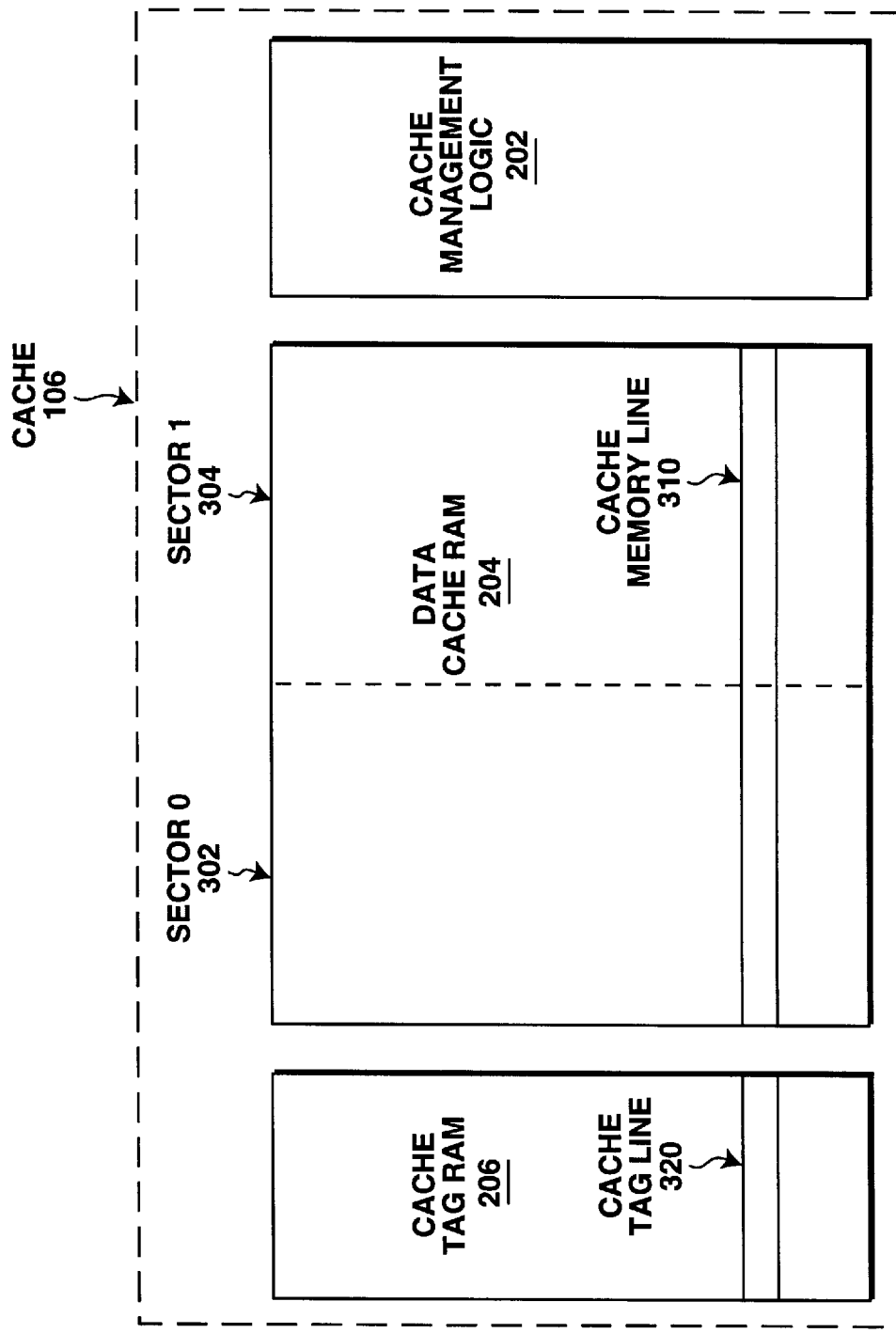
FIG. 3 is a block diagram illustrating one embodiment of the cache memory architecture of the present invention.

Referring now to FIG. 3, the cache memory architecture of one embodiment of the present invention will be described in more detail. In one embodiment of the present invention, the data cache RAM 204 of external cache memory 106 is a direct-mapped, write-back, sectored-by-two cache memory. Data cache RAM 204 of one embodiment is a 256 Kbyte cache memory comprising 4096 (4 k) cache memory lines divided into two sectors 302 and 304 of 32 bytes each. The sectors 302 and 304 are referred to as "Sector 0" and "Sector 1" respectively. In alternative embodiments, cache memory 106 is a set associative cache memory.

Cache memory line 310 in FIG. 3 is an example of a cache memory line of the data cache RAM of the present invention. Sectoring the cache memory such that one cache tag is used for several bytes of information is a method well known in the art to reduce the cost of a cache memory by reducing the number of tags. In one embodiment, cache tag RAM 206 comprises 4096 (4 k) lines of cache tag information. Cache tag RAM 206 comprises one cache tag line for each cache memory line in data cache memory 204. Cache tag line 320 is an example of a cache tag line of the cache tag RAM 206.

Figure 4:
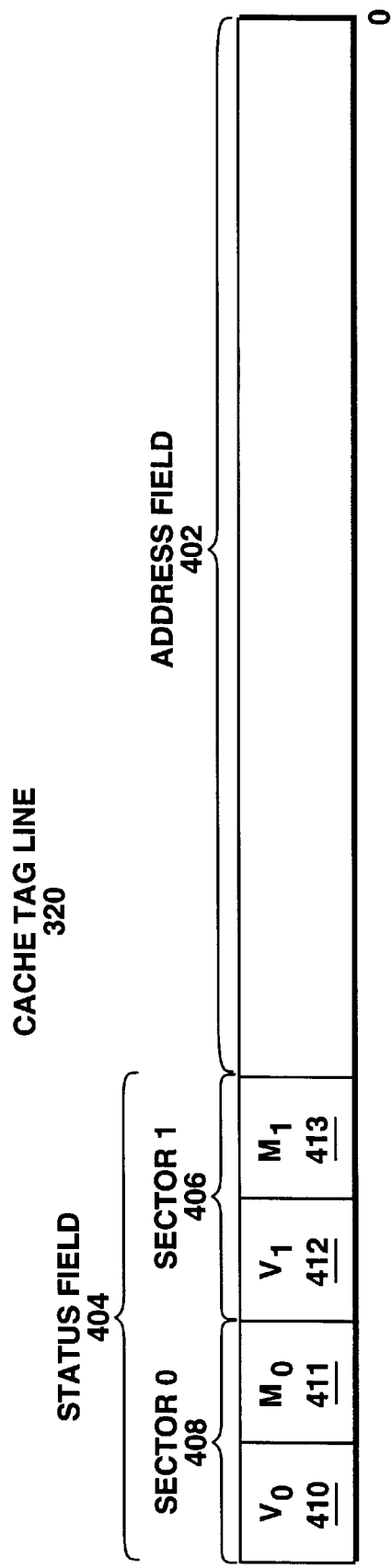
FIG. 4 is a diagram illustrating one embodiment of the cache tag architecture of the present invention.

Referring now to FIG. 4, the cache tag line architecture of one embodiment of the present invention is described with reference to example cache tag line 320. Cache tag line or cache tag 320 comprises an address field 402 and a status field 404. The address field 402 holds the system or alternative memory address of the original code or information which is stored in the associated cache memory line. The status field 404 comprises a plurality of bits indicating the status of the information in the corresponding cache memory line. The status field 404 is interpreted by the cache management logic 202 to direct the actions of the memory subsystem in relation to the information in the cache memory.

In one embodiment, status field 404 comprises four status bits. The status bits are illustrated in FIG. 4 as $V_0$, $M_0$, $V_1$ and $M_1$. Prior art systems use $V_0$ and $M_0$ to indicate the status of Sector 0 and $V_1$ and $M_1$ to indicate the status of Sector 1 in a specific cache memory line. In prior art systems, the status bits only indicate whether the corresponding cache memory information is valid or invalid and whether it has been modified so that it is no longer consistent with information in another cache memory, system memory 102 or alternative memory 105.

Other embodiments of the present invention may include additional status bits for other uses. One example is the "Least Recently Used" or LRU bits used with two- or four-way set associative cache memories, for example, which are also within the scope of the present invention. Other types of status bits such as a parity bit may also be included. The status bits of one embodiment of the present invention, illustrated in FIG. 4 as status bits $V_0$, $M_0$, $V_1$ and $M_1$ (410–413 respectively), are referred to herein as the "valid/modify" status bits. Status bits indicating other status information are within the scope of the present invention.

The cache memory of the present invention may be an external cache memory (level one (L1), level two (L2), or other level cache memory) or the cache memory of the present invention may be configured on processor 101 such as cache memory 101B (FIG. 2). Although the present invention is described herein with reference to a specific cache memory architecture, it will be apparent to one of ordinary skill in the art, that other cache memory sizes, configurations, caching schemes, etc. may be used with the present invention. Also, although the present invention is described herein with reference to a "sectored-by-two" cache memory, it will be apparent to one of ordinary skill in the art that a non-sectored cache memory or a cache memory comprising more sectors may be used with the present invention.

Cache Memory Consistency Method and Apparatus

Cache memory consistency is an important concern in memory subsystem design. The issue of cache memory consistency arises from the fact that information from a given memory location can reside simultaneously in system memory or alternative memory and in one or more cache memories. Furthermore, the information in one cache memory may have a value different from that in memory because one or the other has been updated more recently.

Memory subsystems must have some way to ensure that all references to a memory location retrieve the most recent value.

Software programs may be used to maintain cache memory consistency, but usually, implementation of a hardware cache memory consistency protocol is more efficient. The Modified, Exclusive, Shared and Invalid (MESI) protocol is an example of such a protocol. The MESI protocol is utilized by, among others, Intel Corporation, the corporate assignee of the present invention. The "MESI" protocol is illustrated in Intel Corporation's 1994 databook entitled "Microprocessors: Volume II" on page 2–961.

One embodiment of the present invention uses an "MEI" protocol, a true subset of the MESI protocol. The MEI protocol represents three states:

1) "M"—MODIFIED—indicates that the corresponding cache memory information is valid, is available exclusively in the cache memory and has been modified so that it is no longer consistent with system or alternative memory (whichever it is related to), 2) "E"—EXCLUSIVE—indicates that the corresponding cache memory information is available in the cache memory, it is valid and it has not been modified so that it remains consistent with either system or alternative memory, and 3) "I"—INVALID—indicates that the corresponding cache memory information is invalid, and therefore not available in the cache memory.

When discussing cache memory operation, it is helpful to understand some of the frequently used terms of art. "Cache hit" and "cache miss" are two examples. "Cache hit" is used to describe an event where the information requested by processor 101 is in the cache memory as indicated by the cache tag RAM. Similarly, when the processor 101 attempts to write information to the cache memory and the desired location in cache memory is available, there is also a "cache hit". When the information requested by the processor 101 or the desired location for a write is not available in the cache memory, there is a "cache miss". These terms are well known to those of ordinary skill in the art and are used herein as defined above.

Figure 5:
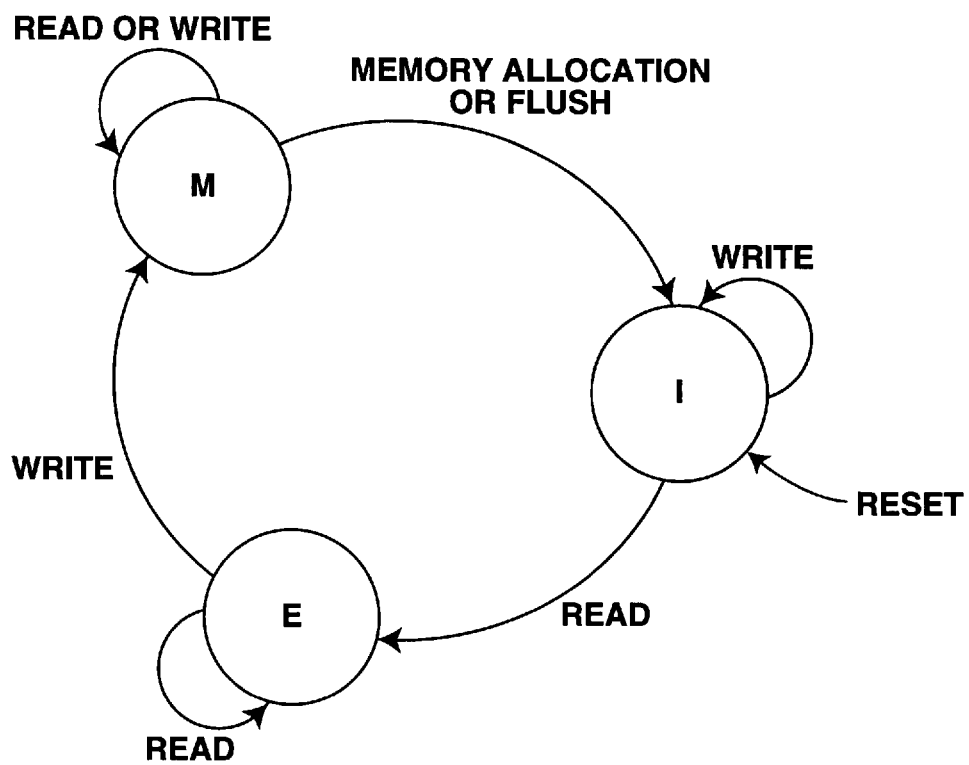
FIG. 5 is a state diagram illustrating the MEI protocol used in one embodiment of the present invention.

FIG. 5 is a state diagram illustrating the state transitions of the three states discussed above. A RESET instruction starts all cache tags in an "I" state indicating that there is no valid information currently residing in the cache memory. If the current state of a cache memory sector is "I", a read from that sector is a "miss" since the information there is not valid. The processor then fetches the requested information from system or alternative memory and updates the cache memory so the next state is "E" indicating that the corresponding information is valid and available both in the cache memory and the appropriate main memory (system or alternative memory). A write to that cache memory sector is also a miss and the cache memory writes through to the system or alternative memory leaving the status "I". If the current state of a cache memory sector is "E", a read is a hit and the next state is also "E". A write to that sector is also a hit, but the next state is "M" since the information has been modified and is no longer the same as the corresponding information in system or alternative memory. If the current state of a cache memory sector is "M", a read or a write to that cache memory sector is a "hit" and the next state is also "M". The use of the MESI protocol and subsets of the MESI protocol, such as the MEI protocol described above, are well known to those of ordinary skill, in the art.

As described above, prior art systems use the $V_0$, $M_0$, $V_1$, and $M_1$ status bits to implement the MEI protocol to indicate the status of the corresponding sectors in cache memory. In prior art systems, the valid/modify status bits have individual meaning and may be decoded individually or by sector. For example, if the $V_0$ bit of the cache tag is set to a "1", the information in sector 0 of the corresponding cache memory line is valid. Similarly, if the $M_0$ status bit of the cache tag is set to a "0", the information in sector 0 of the corresponding cache memory line has not been modified and is therefore, consistent with the system memory or alternative memory.

The status of the information in individual sectors of a corresponding line in cache memory, sector 0 and sector 1 for example, is interpreted to be in an "M", "E", or "I" state as defined above, based on the status of the individual valid/modify status bits. For example, if valid/modify status bits V1=1 and M1=0 in a particular cache tag, the information in sector 1 of the corresponding cache memory line is valid and has not been modified indicating an "E" state according to the state definitions discussed above.

The valid/modify status bits of prior art cache memories, while used to implement the MEI protocol, do not identify whether the corresponding cache memory information is related to system memory or alternative memory. Prior art systems require additional bits or mutually exclusive use of the cache memory as described above to address issues of logical address overlap of two memories.

The present invention uses the same status bits $V_0$, $M_0$, $V_1$ and $M_1$ (valid/modify status bits 410–413 in FIG. 4) not only to implement the MEI protocol, but also to identify whether the corresponding cache memory information is related to the system memory or alternative memory. "Related to" in this case means that the information in the cache memory either was read from that particular memory or will be written to that particular memory when the memory is updated to be consistent with the cache memory. The present invention does this by interpreting or decoding the values of all of the valid/modify status bits together to identify the status of the corresponding information in cache memory. In the present invention, the values of individual valid/modify status bits do not necessarily have meaning by themselves. Thus, the present invention redefines the valid/modify status bits to provide more status information without increasing the size of the cache or reducing the effective cacheable memory.

One embodiment of the present invention makes use of the fact that only nine of sixteen possible states (from all combinations of the four valid/modify status bits) are used to indicate the status of the corresponding cache memory sectors when caching only system memory information. The present invention uses six of the seven remaining states to indicate the status of corresponding cache memory sectors which hold SMRAM information. One embodiment of the present invention is able to represent the various states of alternative memory information using only six states by assuming that if one sector of alternative memory information in cache memory has been modified (also referred to as being "dirty") then the other sector on the same cache memory line is considered to be modified also. Therefore, if both sectors of a given cache memory line contain valid SMRAM information (indicated by "M" or "E" state) and one of the sectors has been modified ("M" state) then both sectors are considered to have been modified. In other words, the present invention does not use an "EM" or an "ME" state (representing that status of sectors 0 and 1 respectively) in reference to a cache memory line of SMRAM information. Both of these states are represented by the "MM" state (sectors 0 and 1 are both in the M state).

FIG. 6 illustrates a state table of one embodiment of the present invention. The first four columns labeled "$V_0$", "$M_0$", "$V_1$" and "$M_1$" identify the various combinations of the valid/modify status bits 410–413. As described above, the valid/modify status bits are the $V_0$, $M_0$, $V_1$ and $M_1$ status bits which comprise the status field 404 (FIG. 4) of the cache tag 320 in the cache tag RAM 206 (FIG. 3). The fifth column of the table in FIG. 6 labeled "Memory" shows the memory indicated by the corresponding state of the valid/modify status bits. The sixth and seventh columns labeled "Sector 0" and "Sector 1" respectively show which state of the MEI protocol is indicated by the corresponding valid/modify status bits.

Still referring to the table in FIG. 6, the first state of the valid/modify status bits can be considered to correspond to either system memory 102 or alternative memory (SMRAM) 105 or it can be viewed as corresponding to neither memory. The first state indicates that the corresponding information is invalid, thus it is not related to either system memory 102 or SMRAM 105. The next eight states correspond to system memory cache information and the following six states correspond to SMRAM or alternative cache memory information in one embodiment. The final combination of the status bits is undefined and not used in this embodiment of the present invention.

Thus, by interpreting the values of all of the valid/modify status bits together to determine the state of the corresponding cache information as illustrated in FIG. 6, the present invention uses the valid/modify status bits not only to implement the MEI protocol, but also to indicate which memory, system memory or alternative memory, the corresponding cache memory information is related to.

The state table in FIG. 6 illustrates one embodiment of the present invention. It will be readily apparent to those of ordinary skill in the art that other combinations of bits may be used to implement the present invention. For different cache memory configurations, different combinations of bits are also used. For example, if the cache memory contains more than two sectors, additional status bits may be required and fewer status bits are required in a non-sectored cache.

Decoding Logic of the Present Invention

Referring back to FIG. 2, the cache tag status field 404 (FIG. 4) described above, is decoded by the status bit decoding logic 208. Status bit decoding logic 208 is part of cache management logic 202. Status bit decoding logic 208 decodes the status field 404 of cache tag 402 (FIG. 4) according to the state table shown in FIG. 6. Implementing decoding logic according to state information is well known to those of ordinary skill in the art.

Cache management logic 202 also determines the next state of the status bits for a given cache memory line based on the MEI protocol (shown in FIG. 5). As shown in FIG. 5 and typical of any state machine, the next state determination is based on the current state and the action that is causing the state to change. As discussed above, the status bits of one embodiment of the present invention are decoded and updated according to the MEI protocol with the exception that a cache memory line containing SMRAM or alternative memory information never has an "EM" or an "ME" state. The "EM" and "ME" states for SMRAM or alternative memory information are both represented by the "MM" state.

Thus, the present invention discloses a method and apparatus for caching system memory information and alternative memory information in a shared cache memory. The present invention distinguishes between system memory information and alternative memory information in the cache memory and also indicates the status of the corresponding cache memory information without increasing the size of the cache tag RAM and without decreasing the effective cacheability of the memory by decreasing the number of address bits. Thus, the present invention provides additional cache memory functionality without using additional cache tag silicon and without decreasing the performance of the cache memory subsystem in terms of effective cacheability.

Whereas many alterations and modifications of the present invention will no doubt become apparent to a person of ordinary skill in the art after having read the foregoing description, it is understood that the particular embodiments shown and described by way of illustration are in no way intended to be considered limiting. Therefore, references to details of various embodiments are not intended to limit the scope of the claims which in themselves recite only those features regarded as essential to the invention.

Thus, a method and apparatus for caching system memory information and alternative memory information in a shared cache memory is described.

I claim:

1. A cache memory for caching data from a first and a second memory that have at least one logical address in common, wherein the data is stored in the cache in a plurality of lines, each line including a first sector and a second sector, wherein the first sector and the second sector each store data from both the first memory and the second memory, the cache memory comprising:

two status bits corresponding to the first sector of each of the cache lines;

two status bits corresponding to the second sector of each of the cache lines, wherein the two status bits corresponding to the first sector of each of the cache lines and the two status bits corresponding to the second sector of each of the cache lines comprise a word having sixteen possible encodings; and status bit decoding logic coupled to decode the word, wherein nine of the sixteen possible encodings indicate that data in a sector is from the first memory and whether the data is modified, exclusive, or invalid, and wherein six of the sixteen possible encodings indicate that data in a sector is from the second memory and whether the data is modified, exclusive, or invalid.

2. The cache memory of claim 1 wherein the first memory is a system memory and the second memory is system management random access memory (SMRAM).

3. In a computer system, a method for managing data in a cache memory shared by a first memory and a second memory having at least one logical address in common, the method comprising the steps of:

storing data in a plurality of cache lines of the cache memory, each cache line of the plurality of cache lines comprising a first sector and a second sector, wherein the first and second sectors of the plurality of cache lines store data from the first memory, the second memory, or the first and second memory, in random combinations;

storing encoded cache coherency and data source information for a data element stored in one of the plurality of cache lines in a word comprising two bits from the first sector and two bits from the second sector; and decoding the word to determine a cache coherency state and a source of the data for the data element, the source comprising one of the first or second memories and one of the first and second sectors, the cache coherency state comprising whether the data is modified, exclusive or invalid.

4. The method of claim 3 wherein the first memory is a system memory and the second memory is system management random access memory (SMRAM).

5. The method of claim 3 wherein the first memory is a system memory and the second memory is system management random access memory (SMRAM).

6. A computer system comprising:

a bus to communicate information;

a processor coupled to the bus to process information;

a first memory coupled to the processor to store data for the processor when the processor is operating in a first mode;

a second memory coupled to the processor to store data for the processor when the processor is operating in a second mode, the first and second memories having at least one logical address in common; and a cache memory coupled to the first and second memories, the cache memory including:

a plurality of cache lines to store data, each comprising a first sector and a second sector, wherein a data element from either the first or second memories are stored in a first sector at one time, and wherein a data element from either the first or second memories is stored in a second sector at one time;

for each cache line, two status bits corresponding to the first sector; and for each cache line, two status bits corresponding to the second sector, wherein the two status bits corresponding to the first sector and the two status bits corresponding to the second sector comprise a four-bit word having sixteen possible encodings; and decoding logic coupled to decode the word, wherein nine of the sixteen possible encodings indicate, for a data element from the first memory, a coherency state and whether the data element is valid, modified, or exclusive, and wherein six of the sixteen possible encodings indicate, for a data element from the second memory, a coherency state and whether the data element is valid, modified, or exclusive.

* * * * *